Jan. 5, 1932. M. J. GARLICK 1,839,669
PRINTER'S HOOK
Filed June 10, 1929
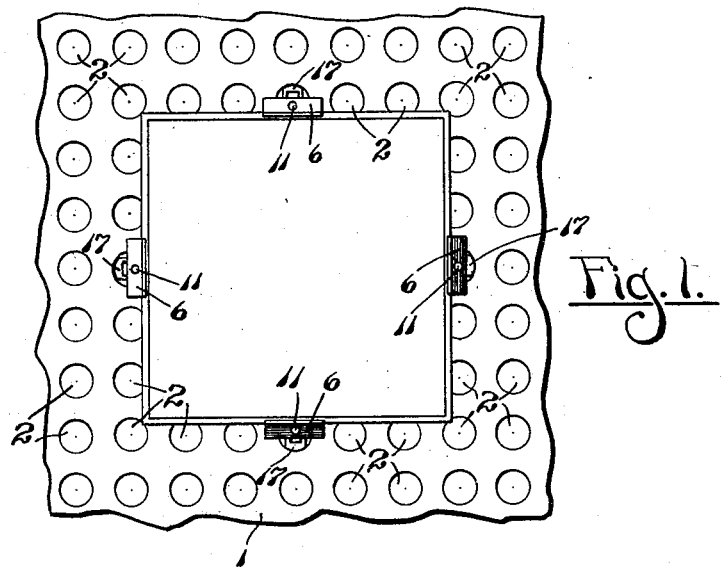
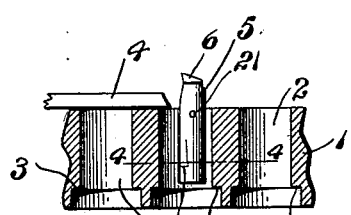
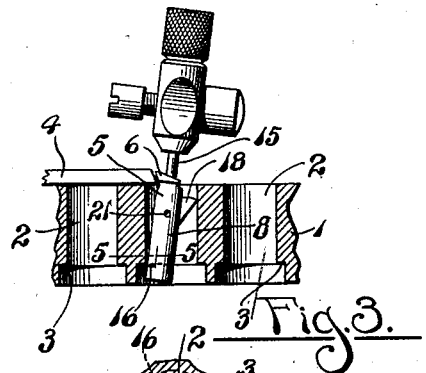
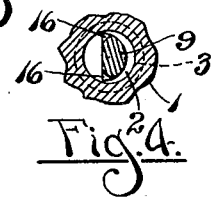
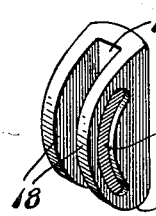
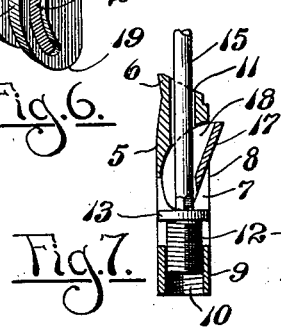
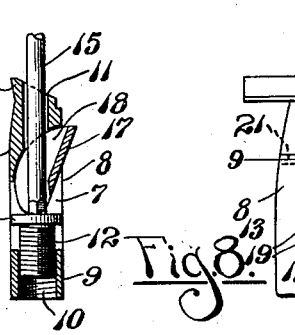
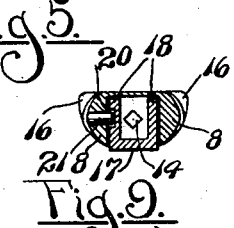
Inventor
Mark J. Garlick
By Liverance and Van Antwerp
Attorneys Patented Jan. 5, 1932

1,839,669

UNITED STATES PATENT OFFICE

MARK J. GARLICK, OF CHICAGO, ILLINOIS, ASSIGNOR TO CHALLENGE MACHINERY COMPANY, OF GRAND HAVEN, MICHIGAN, A CORPORATION OF MICHIGAN

PRINTER'S HOOK

Application filed June 10, 1929. Serial No. 369,664.

This invention relates to a printer's appliance to be used in securing electrotype plates or other plate material used in printing to the bed of the printing press, and for releasably securing and adjusting them to desired positions. The adjustment of the plates has to be very carefully done particularly in multi-color printing as there must be exact registry in order to secure proper results.

Devices of this character have been heretofore made but have been open to several objections both from the cost of manufacture and for the further reason that they do not hold the plate as securely as it should be but permit vibration thereof during the printing operation with a consequent injury to or spoiling of the work which was being done. The present invention is directed to improvements in construction on printers' appliances of the kind noted, which are commonly termed printers' hooks, so as to greatly reduce their cost and to provide a hook which when used to secure one of the plates shall be held very firmly against any movement, vibration or the like.

An understanding of the invention for the attainment of these ends may be had from the following description taken in connection with the accompanying drawings, in which, Fig. 1 is a plan view showing one of the plates attached to a fragmentary portion of a bed by use of the hooks of my invention.

Fig. 2 is a fragmentary vertical section showing one of the hooks being introduced into one of the vertical openings in the bed.

Fig. 3 is a view similar to Fig. 2, illustrating the hook as it is brought into operative connection with the plate.

Figs. 4 and 5 are, respectively, fragmentary horizontal sections taken on the respective planes of line 4—4 of Fig. 2 and line 5—5 of Fig. 3.

Fig. 6 is an enlarged perspective view of the wedging jaw forming one element of the hook of my invention.

Fig. 7 is an enlarged central vertical section through the hook of my invention illustrating the manner of operating the same.

Fig. 8 is an enlarged elevation of said hook, and

Fig. 9 is a horizontal section on the plane of line 9—9 of Fig. 8.

Like reference characters refer to like parts in the different figures of the drawings.

The base 1 over which the electrotype or other plates are to be placed is usually a casting and has a large number of closely associated vertical holes 2 circular in cross section extending downwardly therethrough, said holes or openings being enlarged adjacent their lower ends whereby annular shoulders 3 are made at the juncture of the larger and smaller portions of said openings. The plate 4 upon the outer side of which the characters to be printed are formed is laid upon the upper side of the base 1. It has downwardly and outwardly beveled edges and the edge portions of the plate extend at all sides partly over the upper ends of some of the openings 2 made in the upper plate.

My invention of printer's hook is designed to be inserted in selected openings, the same securely held and retained in the openings while engaging jaws of the upper ends of the hooks bear against the beveled edges of the plate and securely connect it to the base; yet at the same time the hooks may be very readily released for removal and replacement of the plate by another or the same may be adjusted so as to shift the plate over the base to an exact desired position.

The printer's hook which I have devised comprises a substantially vertical post or stem 5 at the upper end of which is a jaw member 6 shaped at one side edge to bear against the beveled edges of the plate 4. The stem 5 is cut through from one side to the other between its upper and lower ends making a relatively large opening 7 at each side of which are the spaced apart depending sides 8 of the stem which integrally connect with the lower end portion 9 of the stem below said opening 7. The lower portion 9 has a vertical opening 10 therethrough which is interiorly threaded as indicated. Likewise, the portion of the stem above said opening 7 has a vertical opening 11 extending therethrough the axis of which is coincident with the vertical axis of the threaded opening 10.

A screw 12 threads into the upper end of the opening 9 and at its upper end is provided with a flat head 13 in which a square opening 14 is preferably made adapted to receive the square lower end of a shank 15 which may be passed downwardly through the opening 11 into said opening 14 for the purpose of adjusting the screw 12 to different positions. It is apparent that the screw 12 and its head may be readily placed in the opening cut out at 7 and threaded into the opening 10 in the assembly of the device.

At the lower end portion 9 of the stem and at the same side thereof as the jaw 6, two projecting lugs 16 are provided having horizontal upper faces which are located so that when the stem is introduced into an opening 2 and is moved toward the adjacent side of the opening, said lugs will pass underneath the annular shoulder 3 adjacent the lower end of the opening as shown in Fig. 5. It is to be understood that the diameters of the holes or openings 2 are considerably in excess of the thickness of the stem 5 and that said stem may be very readily dropped into any selected opening even though it is partly covered at one side by the plate 4.

Located within the upper portion of the opening 7 in the stem 5 is a wedging member of channel form having a back 17 and two parallel spaced apart flanges 18 of the curved form shown and which, at their lower ends, have curved cam formation indicated at 19 resting upon and bearing against the upper side of the head 13 of the screw 12. The separating of the sides 18 permits the passage of the shank 15 to the screw 12 to operate the same. In one side 18, a curved groove 20 is cut associated with and entering which is a pin 21 passing through one of the depending sides 8 of the stem. The pin at its inner end entering said groove serves to guide and control the movements of the wedging member as the screw 12 is raised or lowered. On elevating the screw the upper end of the wedging member is moved outwardly while on lowering the screw the wedging member is free to move back within the opening 7 between said sides 8.

When a plate 4 is located over the base 1, hook devices of the character described with the screws 12 in lower position are dropped into certain of the openings 2 around and at the edges of the plate. The jaws 6 are pressed toward the beveled edges of the plate 4 and by operating the screws 12 in the various hook devices used, the wedge members are moved outwardly until their upper end portions engage against the sides of the openings 2 thereby moving the jaws 6 over against the adjacent edges of the plate 4; and at the same time the lugs 16 are brought underneath the annular shoulder at 3 of the respective openings in which they are located. It is of course apparent that by operating the devices at opposite edges of the plate to a greater or less extent said plate may be adjusted very carefully to an exact position.

It will further be noted that when the wedging member bears against the side of the opening 2 it bears thereagainst but a short distance below the upper end of said opening. The point of pressure of the jaws 6 against the edge of a plate 4 and the point of pressure of the wedging member against the side of an opening 2 are so nearly in the same horizontal plane that the vertical length of the stem 5 between them cannot possibly bend or vibrate during the printing operation and there is no possibility of any movement or even vibratory change of position of the plate 4 when secured in place with the hooks of my invention.

This construction is very practical and serviceable. Outside of the pin 21 used there are but three parts all of easy fabrication which can be quickly and readily assembled making the cost low. The hook is strong and durable and is a marked improvement over printers' hooks of the same character now in use. The invention is defined in the claims appended hereto and is to be considered comprehensive of all forms of structure coming within their scope.

I claim:

1. A device of the class described comprising, a vertical stem having an opening therethrough between its sides and intermediate its upper and lower ends, the portion of said stem below said opening having a vertical screw threaded opening therein, a plate engaging jaw in the upper end of the stem, a screw threaded into said threaded opening, and a wedging member mounted in the upper part of said opening in the stem above the screw and engaging with its lower end against the upper end of said screw, whereby on upward movement of the screw the wedging member is moved outwardly at its upper end with reference to said stem.

2. A device of the class described comprising, a vertical stem having an opening therethrough between its upper and lower ends, said opening being bounded at its sides by vertical side portions of the stem, the part of the stem below said opening having a vertical interiorly threaded opening therein, a plate engaging jaw at the upper end of the stem, a screw threaded into said threaded opening, a wedging member of channel form located in the upper part of said opening through the stem having the lower ends of its sides bearing against the upper end of the screw, and guiding means mounted on said stem engaging with a side of the wedging member for turning the same outwardly at its upper end with reference to said stem on upward movement of the screw.

3. In a device of the class described, a vertical stem having an opening therethrough between its upper and lower ends, said opening being bounded at its side by vertical side portions of the stem, the lower part of said stem having vertical interiorly threaded opening therein, a plate engaging jaw at the upper end of the stem, a screw threaded into said threaded opening, said screw having a head with a flat upper surface, a channel shaped wedging member located in the opening in said stem above said screw, the lower ends of the sides of the wedging member bearing against the upper side of the head of the screw, one of said sides of said channel member having an arc shaped groove therein, and a pin mounted on one of the side portions of said stem extending into said groove, for the purposes described.

4. A construction containing the elements in combination defined in claim 3, the upper end portion of said stem having a vertical opening therethrough for the passage of a screw operating implement downwardly therethrough and between the sides of the wedging member to engage with the screw at its upper end.

5. A device of the class described comprising, a vertical stem having a plate engaging jaw at its upper end, a screw mounted interiorly of and at the lower end portion of the stem, a wedging member mounted interiorly of the stem and above said screw, engaging at its lower end the upper end of the screw, and means for guiding the movements of the wedging member whereby on upward movement of the screw the upper end of the wedging member is moved outwardly with respect to said stem.

In testimony whereof I affix my signature.

MARK J. GARLICK.